(12) United States Patent
Arthur et al.

(10) Patent No.: US 8,557,138 B2
(45) Date of Patent: Oct. 15, 2013

(54) PITCH EMULSIONS

(75) Inventors: Lisa M. Arthur, Conyers, GA (US); John B. Hines, Atlanta, GA (US); Brian L. Swift, Oxford, GA (US); Pablo G. Dopico, Conyers, GA (US); Michael C. Peck, Snellville, GA (US); Roger Scott Johnson, Lilburn, GA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 106 days.

(21) Appl. No.: 13/057,159

(22) PCT Filed: Jul. 31, 2009

(86) PCT No.: PCT/US2009/052444
§ 371 (c)(1),
(2), (4) Date: Mar. 30, 2011

(87) PCT Pub. No.: WO2010/017108
PCT Pub. Date: Feb. 11, 2010

(65) Prior Publication Data
US 2011/0168943 A1   Jul. 14, 2011

Related U.S. Application Data

(60) Provisional application No. 61/085,840, filed on Aug. 2, 2008.

(51) Int. Cl.
*C09K 3/22* (2006.01)

(52) U.S. Cl.
USPC .................................. 252/88.1; 252/88.2

(58) Field of Classification Search
None
See application file for complete search history.

(56) References Cited

U.S. PATENT DOCUMENTS

| | | | |
|---|---|---|---|
| 2,238,776 A | 4/1941 | Kleinicke | |
| 3,563,792 A | 2/1971 | Deuzeman | |
| 3,702,798 A | 11/1972 | Shannon | |
| 3,943,117 A | 3/1976 | Force | |
| 3,954,662 A | 5/1976 | Salyer et al. | |
| 3,961,752 A | 6/1976 | Doeksen | |
| 4,075,188 A | 2/1978 | Vardell, Jr. | |
| 4,154,725 A | 5/1979 | Otrhalek et al. | |
| 4,171,276 A | 10/1979 | Brehm | |
| 4,238,304 A | 12/1980 | Zucker | |
| 4,308,200 A | 12/1981 | Fremont | |
| 4,417,992 A | 11/1983 | Bhattacharyya et al. | |
| 4,476,276 A | 10/1984 | Gasper | |
| 4,495,095 A | 1/1985 | Lawson et al. | |
| 4,524,024 A | 6/1985 | Hughes | |
| 4,551,261 A | 11/1985 | Salihar | |
| 4,594,268 A | 6/1986 | Kirwin | |
| 4,650,598 A | 3/1987 | Roberts et al. | |
| 4,795,764 A | 1/1989 | Alm et al. | |
| 4,801,635 A | 1/1989 | Zinkin et al. | |
| 4,822,425 A | 4/1989 | Burch et al. | |
| 4,913,585 A | 4/1990 | Thompson et al. | |
| 4,971,720 A | 11/1990 | Roe | |
| 5,079,036 A | 1/1992 | Roe et al. | |
| 5,124,363 A | 6/1992 | Stern | |
| 5,132,399 A | 7/1992 | MacDonald | |
| 5,143,645 A | 9/1992 | Roe | |
| 5,164,480 A | 11/1992 | Huibers et al. | |
| 5,194,174 A | 3/1993 | Roe et al. | |
| 5,310,494 A | 5/1994 | Bennett | |
| 5,350,596 A | 9/1994 | Walker, Jr. | |
| 5,352,297 A | 10/1994 | Peters | |
| 5,409,626 A | 4/1995 | Muth | |
| 5,441,566 A | 8/1995 | Vaughan | |
| 5,480,584 A | 1/1996 | Urano et al. | |
| 5,527,482 A | 6/1996 | Pullen et al. | |
| 5,536,429 A | 7/1996 | Bennett et al. | |
| 5,578,239 A | 11/1996 | Bennett | |
| 5,670,571 A | 9/1997 | Gabrielson et al. | |
| 5,895,347 A | 4/1999 | Doyle | |
| 5,958,287 A | 9/1999 | Pullen | |
| 6,124,366 A | 9/2000 | Pullen et al. | |
| 6,355,083 B1 | 3/2002 | Ogzewalla | |
| 6,469,125 B1 | 10/2002 | Fontana et al. | |
| 6,589,442 B1 * | 7/2003 | Wilson et al. | 252/70 |
| 6,906,130 B2 | 6/2005 | Tutin et al. | |
| 7,108,800 B2 | 9/2006 | Tran et al. | |
| 7,398,935 B2 | 7/2008 | Tran et al. | |
| 7,842,382 B2 | 11/2010 | Helbing | |
| 2005/0268530 A1 | 12/2005 | Brewer et al. | |
| 2008/0064284 A1 | 3/2008 | Srinivasan et al. | |
| 2008/0064799 A1 | 3/2008 | Srinivasan et al. | |
| 2008/0179570 A1 | 7/2008 | Hurd et al. | |
| 2008/0194795 A1 | 8/2008 | Hurd et al. | |
| 2008/0280787 A1 | 11/2008 | Rediger et al. | |
| 2009/0065736 A1 | 3/2009 | Johnson et al. | |
| 2009/0194731 A1 | 8/2009 | Hurd et al. | |
| 2009/0301972 A1 | 12/2009 | Hines et al. | |
| 2010/0025625 A1 | 2/2010 | Swift et al. | |

FOREIGN PATENT DOCUMENTS

| | | |
|---|---|---|
| GB | 1302001 | 1/1973 |
| JP | 2008/0222802 A | 9/2008 |
| NZ | 521650 A | 5/2005 |
| WO | 96/00199 A1 | 1/1996 |
| WO | 2005/121272 A1 | 12/2005 |

* cited by examiner

*Primary Examiner* — Necholus Ogden, Jr.
(74) *Attorney, Agent, or Firm* — Ram W. Sabnis

(57) ABSTRACT

An emulsion of pitch in water preferably characterized by having a lower level of tack on drying by virtue of using as the emulsifying agent a fatty acid, a chemically modified fatty acid, a rosin acid, a chemically modified rosin acid, or combinations thereof, especially a tall oil fatty acid, or a chemically modified tall oil fatty acid, where the pitch emulsion is useful for reducing the development of fugitive dust in a dust-forming material.

25 Claims, No Drawings

PITCH EMULSIONS

CROSS REFERENCE TO RELATED APPLICATIONS

This application claims the benefit of and incorporates by reference co-pending provisional application Ser. No. 61/085,840 filed Aug. 2, 2008.

FIELD OF THE INVENTION

The present invention broadly relates to an emulsion of pitch, such as a tall oil pitch, coal tar pitch, heavy crude oil, heavy petroleum distillates, Fischer-Tropsch products, or asphalt (bitumen), in water useful for reducing the development of fugitive dust, especially the loss of coal dust from open top railcars (hopper cars) transporting coal.

BACKGROUND OF THE INVENTION

It has been estimated that open top railcars transporting coal across the United States from western mines may lose anywhere from 2 to 5% by weight of the coal load by fugitive dust losses during transit.

Not only does this loss of coal represent an economic loss and an environmental contamination issue, particular for rail lines adjacent populated areas, but the collection of coal dust on and around the train tracks is also believed to contribute to train derailments. Thus, the art has long sought ways for reducing the loss of coal from the railcars during transit.

Over the years, a variety of materials have been used and/or considered as a way of reducing the level of fugitive dust associated with the handling of coal. Such fugitive dust-reducing compositions also generally have utility in a variety of other de-dusting applications as well.

Applicants understand that in some cases tall oil pitch emulsions have not been accepted as being suitable for the coal transport application because the conventional emulsions exhibit an excessive level of tack, i.e., stickiness, over a significant range of usage conditions.

One approach for reducing the tackiness of pitch emulsions involves adding a finely divided filler, such as calcium carbonate, as a component of an emulsified pitch. The lower tack pitch emulsion can be made by dispersing the pitch, such as a tall oil pitch or asphalt (bitumen), in water as the continuous phase in the presence of an emulsifying agent and in association with a finely divided filler, especially finely divided calcium carbonate. A variety of materials were identified as suitable emulsifying agents.

Applicants now have surprisingly found that in the presence of certain emulsifying agents, such as the tall oil products and derivatives described in U.S. patent application Ser. Nos. 12/166,387 (U.S. Patent Publication 2009-0065736 A1); 12/023,886 (U.S. Patent Publication 2008-0194795 A1); 11/669,713 (U.S. Patent Publication 2008-0179570 A1) and 12/363,483 filed Jan. 30, 2009 and entitled Oxidized and Maleated Derivative Compositions, it is not necessary to include the finely divided filler material in the emulsified pitch in order to reduce the tack of the pitch emulsions.

SUMMARY OF THE INVENTION

In one embodiment, the present invention provides a pitch emulsion comprising particles of a pitch, such as a tall oil pitch, coal tar pitch, heavy crude oil, heavy petroleum distillates, Fischer-Tropsch products, or asphalt (bitumen), dispersed in water in the presence of an emulsifying agent comprising a fatty acid, a chemically modified fatty acid, a rosin acid, a chemically modified rosin acid, or combinations thereof. Typically, the emulsifying agent is partially neutralized.

The pitch emulsion is useful for reducing fugitive dust formation associated with dust-forming materials. One useful characteristic of the pitch emulsion of the present invention is that the emulsion dries to a film of reduced tackiness. Particularly useful emulsifying agents are based on products containing a tall oil fatty acid or a chemically modified tall oil fatty acid. Such products can be selected from the group consisting of crude tall oil, distilled tall oil (including products identified as TOFA), chemically modified tall oil (including products identified as dimer acids, oxidized tall oil, maleated tall oil, oxidized and maleated tall oil and chemically-modified versions thereof) and mixtures thereof. Other fatty acids-based products, such as those derived from animal or plant derived oils and their derivatives, also can be used.

In another embodiment, the present invention also relates to a method of making a pitch emulsion comprising blending, with sufficient agitation to produce an emulsion, a molten pitch, such as a tall oil pitch, coal tar pitch, heavy crude oil, heavy petroleum distillates, Fischer-Tropsch products, or asphalt (bitumen), with an emulsifying agent comprising a fatty acid, a chemically modified fatty acid, a rosin acid, a chemically modified rosin acid, or combinations thereof. Typically, the emulsifying agent is partially neutralized. Particularly useful emulsifying agents are based on products containing a tall oil fatty acid or a chemically modified tall oil fatty acid. Such products can be selected from the group consisting of crude tall oil, distilled tall oil (including products identified as TOFA), chemically modified tall oil (including products identified as dimer acids, oxidized tall oil, maleated tall oil, oxidized and maleated tall oil and chemically-modified versions thereof) and mixtures thereof. Other fatty acids-based products, such as those derived from animal or plant derived oils and their derivatives, also can be used.

In another embodiment, the present invention also is directed to a method for reducing the development of fugitive dust in a dust-forming material, particularly associated with the transportation of dust producing bulk materials such as coal, comprising applying to the dust-forming material a pitch emulsion in an amount to reduce fugitive dust formation, the pitch emulsion comprising particles of a pitch, such as a tall oil pitch, coal tar pitch, heavy crude oil, heavy petroleum distillates, Fischer-Tropsch products, or asphalt (bitumen), dispersed in water in the presence of an emulsifying agent comprising a fatty acid, a chemically modified fatty acid, a rosin acid, a chemically modified rosin acid, or combinations thereof. Typically, the emulsifying agent is partially neutralized. Particularly useful emulsifying agents are based on products containing a tall oil fatty acid or a chemically modified tall oil fatty acid. Such products can be selected from the group consisting of crude tall oil, distilled tall oil (including products identified as TOFA), chemically modified tall oil (including products identified as dimer acids, oxidized tall oil, maleated tall oil, oxidized and maleated tall oil and chemically-modified versions thereof) and mixtures thereof. Other fatty acids-based products, such as those derived from animal or plant derived oils and their derivatives, also can be used.

In an alternative embodiment, a pitch emulsion that dries to a film of reduced tackiness comprises particles of a pitch, such as the pitch identified above, and including tall oil pitch, coal tar pitch, heavy crude oil, heavy petroleum distillates, Fischer-Tropsch products, or asphalt (bitumen), dispersed in water in the presence of an emulsifying agent and associated with a finely divided filler, especially a finely divided calcium salt such as calcium carbonate. In this alternative embodiment, it is not necessary to limit the emulsifying agent to the fatty acid-based materials and rosin acid-based materials identified above. Rather, the list of suitable emulsifying agents can be expanded to include cationic, anionic, nonionic and amphoteric materials. In this embodiment, the suitability of any particular emulsifier material and an appropriate quantity to use can be selected following routine testing. Protein-based emulsifiers, such as soy-protein based materials, gelatin, lecithin, casein and particularly the alkali salts, e.g., sodium and ammonium salts, of casein; resinous soaps and resinous emulsions, and certain Maillard reaction products as described in U.S. application Ser. No. 12/479,087, can be used. Casein has proven to be a suitable emulsifier, in this alternative embodiment, especially an alkali caseinate such as sodium or ammonium caseinate. The alkali caseinate can be preformed or it can be formed in situ when preparing the aqueous phase for the emulsion, for example by mixing casein with an alkali hydroxide during the preparation of the aqueous phase.

These and other embodiments are set forth in the following description. Still other embodiments will be apparent to those of ordinary skill in the art after consideration of the specification.

DETAILED DESCRIPTION OF THE INVENTION

The present invention relates to a pitch emulsion, to its method of preparation and to the application of the emulsion for a variety of uses.

The invention particularly relates to a pitch emulsion, particularly pitch emulsions that dry to a film of reduced tackiness relative to the tackiness of an unfilled pitch emulsion made using a proteinaceous casein emulsifier. The pitch emulsion of the present invention comprises particles of a pitch, such as a tall oil pitch, coal tar pitch, heavy crude oil, heavy petroleum distillates, Fischer-Tropsch products, or asphalt (bitumen), dispersed in water in the presence of an emulsifying agent comprising a fatty acid, a chemically modified fatty acid, a rosin acid, a chemically modified rosin acid, or combinations thereof. Typically, the emulsifying agent is partially neutralized. Particularly useful emulsifying agents are based on products containing a tall oil fatty acid or a chemically modified tall oil fatty acid. Such products can be selected from the group consisting of crude tall oil, distilled tall oil (including products identified as TOFA), chemically modified tall oil (including products identified as dimer acids, oxidized tall oil, maleated tall oil, oxidized and maleated tall oil and chemically-modified versions thereof) and mixtures thereof. Other fatty acids-based products, such as those derived (saponified) from animal or plant derived oils and their derivatives, also can be used.

As is known in the art, tall oil refers to the resinous yellow-black oily liquid obtained as an acidified byproduct in the Kraft or sulfate processing of pine wood. According to this process, pinewood is digested with alkali and sulfide, producing tall oil soap and crude sulfate turpentine as by-products. Acidification of this tall oil soap provides crude tall oil. Crude tall oil, prior to refining, is normally a mixture of rosin acids, fatty acids, sterols, high-molecular weight alcohols, and other alkyl chain materials (See <<nzic.org.nz/ChemProcesses/forestry/4G.pdf>>). Distillation of this crude tall oil is used to recover a variety of products. One of these products is tall oil pitch, which is a known material of commerce, and is accordingly well known in the art.

The precise composition of a tall oil pitch will depend, in part, on the process by which it is isolated. By definition, tall oil pitch is the least volatile fraction and least water compatible fraction recovered during the distillation of crude tall oil (CTO). Distillation of CTO yields relatively volatile materials that primarily consist of so-called heads, rosin and fatty acids. The least volatile residue from this distillation process is tall oil pitch. Tall oil pitch is a semi-fluid, tar-like material with an acid value of 25-50. Typically, tall oil pitch contains approximately 5 to 20% fatty acids, 5-20% resin acids and 60-90% of neutral materials commonly referred to as "unsaponifiables" which includes higher alcohols and sterols, where these percentages are on a weight basis. Tall oil pitch is hydrophobic in character. Dimerized rosin and dimerized fatty acid also are often found in tall oil pitch. See, e.g., U.S. Pat. Nos. 3,943,117; 4,075,188; 4,154,725; 5,164,480; 5,132,399; 4,524,024; 4,495,095; and 4,238,304 for various processes that provide tall oil pitch. It also is understood by those skilled in the art that because tall oil pitch is derived from natural sources, its composition also varies among the various sources.

Tall oil pitch is commercially available from a variety of sources including Georgia-Pacific Chemicals LLC (XTOL® Tall Oil Pitch).

Coal tar pitch is a byproduct of coke production and coal gasification. Coal tar pitch is a complex mixture containing polycyclic aromatic hydrocarbons and heterocyclic compounds.

Asphalt (bitumen) is a sticky, black and highly viscous liquid or semi-solid that is present in most crude petroleums and in some natural deposits sometimes termed asphaltum. It too is commercially available from a wide range of sources.

Other materials that can be used to form a pitch emulsion in accordance with the present invention include heavy crude oil, heavy petroleum distillates, and Fischer-Tropsch products As used throughout the specification and claims, therefore, the term pitch is intended to embrace tall oil pitch, coal tar pitch, heavy crude oil, heavy petroleum distillates, tar-like Fischer-Tropsch products, and asphalt (bitumen).

Due to the usual softening temperature of pitch and particularly tall oil pitch, typically 20°-50° C., one difficulty often encountered upon the use of pitch emulsions, such as tall oil pitch emulsions, is that the dried emulsion is too soft and tacky for a particular use. The present invention is based on the discovery that by emulsifying the pitch in water in the presence of one of a specific group of emulsifying agents (emulsifiers), i.e., an emulsifier comprising a fatty acid, a chemically modified fatty acid, a rosin acid, a chemically modified rosin acid, or combinations thereof, and especially comprising a tall oil fatty acid, or a chemically modified tall oil fatty acid, the tacky character of a film produced upon drying the pitch emulsion is substantially reduced. Typically, the emulsifying agent is partially neutralized. Particularly useful products containing a tall oil fatty acid or a chemically modified tall oil fatty acid can be selected from the group consisting of crude tall oil, distilled tall oil (including products identified as TOFA), chemically modified tall oil (including products identified as dimer acid, oxidized tall oil, maleated tall oil, oxidized and maleated tall oil and chemically-modified versions thereof) and mixtures thereof.

Broadly speaking, fatty acids and chemically modified fatty acids used as the emulsifying agent in accordance with the present invention constitute straight-chain or branched, saturated, mono- or polyunsaturated fatty acid radicals having 8 to 24 carbon atoms, in particular 12 to 22 carbon atoms and can be obtained from a variety of sources. Representative fatty acids include oleic acid, lauric acid, linoleic acid, linolenic acid, palmitic acid, stearic acid, ricinoleic acid, myristic acid, arachidic acid, behenic acid and mixtures thereof.

Through the use of known saponification techniques, a number of animal and vegetable oils (triglycerides), such as linseed (flaxseed) oil, castor oil, tung oil, soybean oil, cottonseed oil, olive oil, canola oil, corn oil, sunflower seed oil, peanut oil, coconut oil, safflower oil, palm oil and mixtures thereof, to name just a few, can be used as a source of the fatty acid(s) for making an emulsifying agent used in connection with the present invention. One source of fatty acids is tall oil, and particularly distilled tall.

The principle rosin acids are abietic acid, dehydroabietic acid, isopimaric acid and pimaric acid. One source of rosin acids is tall oil, and particularly distilled tall oil. Generally, chemically modified rosin acids of interest would retain some polar group like carboxylic acid or a polar group that has been added like an amine (rosin amine), polyethylene glycol chain (as a non-ionic emulsifier) or additional acid functionality through a Diels Alder reaction with fumaric or maleic acid/anhydride. Accordingly, chemically modified rosin acids include disproportionated rosins, maleated rosin acids, diethylene tetraamine amido amines of rosin acids, amine-modified rosin acids, rosin salts, rosin ethoxylates, phenolic modified rosins, dimerized rosins, rosin-formaldehyde adducts and hydrogenated rosin.

As noted above, distillation of crude tall oil is used to recover a variety of products and it is a separate subset of these products that also is used in accordance with the present invention as the emulsifying agent, and/or for producing the emulsifying agent used in the emulsification of the pitch component. In particular, a suitable emulsifying agent used in accordance with the present invention comprises a tall oil fatty acid, or a chemically modified tall oil fatty acid and can be selected from the group consisting of crude tall oil (CTO), distilled tall oil (DTO), TOFA, chemically modified tall oil and mixtures thereof. Distilled tall oil is a mixture of fatty acids and rosin acids. TOFA is the fatty acid fraction that is more volatile than DTO. Chemically modified tall oil includes dimer acid, oxidized tall oil (MTO), maleated tall oil, oxidized and maleated tall oil (Oxmal) and other chemically modified maleated tall oil. Several of these materials are described in U.S. non-provisional application Ser. Nos. 12/166,387 (U.S. Patent Publication 2009-0065736 A1); 12/023,886 (U.S. Patent Publication 2008-0194795 A1); 11/669,713 (U.S. Patent Publication 2008-0179570 A1) and 12/363,483 (entitled OXIDIZED AND MALEATED DERIVATIVE COMPOSITIONS), the disclosures of which are hereby incorporated in their entirety herein by reference.

The main unsaturated fatty acids in crude tall oil are oleic acid, and linoleic acid. Suitable emulsifiers for use in the present invention thus contain oleic acid, linoleic acid and/or chemically modified versions thereof as noted above. Representative tall oil products, which are commercially available from Georgia-Pacific Chemicals LLC, Atlanta, Ga., and which are suitable for use as an emulsifying agent in accordance with the present invention include XTOL® 100, XTOL® 101, XTOL® 300, XTOL® 304, XTOL® 520, XTOL® 530, XTOL® 540, XTOL® 542, XTOL® 656, XTOL® 690, XTOL® 692, XTOL® MTO, LYTOR® 100, LYTOR® 105 and LYTOR® 105K, LYTOR® 110 and LYTOR® 307.

Chemically modified, maleated tall oil includes chemical modifications of maleated tall oil fatty acids selected from the group consisting of (1) esterification of the maleated tall oil fatty acids with ricinoleic acid, (2) amidation of the maleated tall oil fatty acids using a polyamine supplied in an amount sufficient to cause cross linking between maleated fatty acid molecules, (3) a combination of esterification and amidation of the maleated tall oil fatty acids using an amino alcohol supplied in an amount sufficient to cause cross linking between maleated fatty acid molecules, (4) esterification of the maleated tall oil fatty acids with an alkynyl alcohol (acetylenic alcohol) selected from propargyl alcohol, 1-hexyn-3-ol, 5-decyne-4,7-diol, oxyalkylated propargyl alcohol and mixtures thereof, (5) amidation of the maleated tall oil fatty acids with morpholine, (6) amidation of the maleated tall oil fatty acids with a fatty imidazoline, (7) esterification of the maleated tall oil fatty acids with a phosphate ester, (8) reaction of the maleated tall oil fatty acids with a metal chelator (metal chelator modification), (9) reaction of the maleated tall oil fatty acids with an amino acid, (10) xanthate modification, (11) thiophosphate ester modification, (12) hydroxamic acid modification, (13) sulfonate modification, (14) sulfate modification and combinations thereof. See particularly U.S. patent application Ser. No. 12/166,387 (U.S. Patent Publication 2009-0065736 A1).

The amount of emulsifier to use depends to some extent on the particular characteristics of the pitch being used. Usually, the emulsifier will constitute anywhere from about 1 to 100% by weight of the pitch (i.e., a weight ratio of 0.01:1 to 1:1 of emulsifier to pitch) intended to be emulsified, more often the emulsifier comprises from 20 to 95% by weight of the pitch and most often the emulsifier comprises from 25 to 90% by weight of the pitch. As noted, one suitable emulsifier comprises a tall oil fatty acid containing oleic acid and/or linoleic acid, and/or chemically modified species of oleic acid and/or linoleic acid and can conveniently be selected from the group consisting of crude tall oil, distilled tall oil, TOFA, chemically modified tall oil and mixtures thereof, where chemically modified tall oil includes dimer acid, oxidized tall oil, maleated tall oil, oxidized and maleated tall oil and other chemically modified maleated tall oil. The suitability of any one of these particular emulsifiers and an appropriate quantity to use in the emulsification of a particular source of pitch can be selected following routine testing.

The pitch emulsion of the present invention is conveniently formed by first preparing an aqueous alkaline phase and then mixing the so-prepared aqueous phase with molten pitch in the presence of the fatty acid-based emulsifier, especially a tall oil fatty acid-based emulsifier. Usually, a suitable emulsion is prepared at a solids concentration between about 30 and 60 percent solids, usually between about 40 and 50 percent solids, the main solids being the pitch itself, and the emulsifier. For a variety of reasons, the emulsion is usually prepared at the highest solids content possible. Following the formation of an emulsion by mixing the aqueous phase with the molten pitch and the emulsifier, the solids content can be reduced simply by adding additional water. Indeed, it may be desirable to ship the pitch emulsion at a significantly higher content of solids than is needed for any particular end use application, so that the additional water is added at the site where the emulsion is used. One of the benefits of the present invention is that the pitch emulsion of the present invention, particularly a tall oil pitch emulsion, can be significantly diluted before use, yet the emulsion will remain stable long enough for it to be applied in a typical commercial setting.

In its simplest form the aqueous phase is prepared by mixing water (which forms the continuous phase of the emulsion) with a base, usually caustic (NaOH), and then adding the pitch and the emulsifier (heated to a temperature at which the pitch is sufficiently fluid to disperse easily in water) together with sufficient agitation to produce the emulsion. Additional heat may be applied to facilitate complete mixing.

Following the formation of an emulsion by mixing the aqueous phase with the molten pitch, the solids content can be reduced simply by adding additional water.

The distributed pitch particles in the emulsion are typically smaller than 2 microns and normally average in the range of 1 to 3 microns.

When forming a pitch emulsion with a fatty acid, a chemically modified fatty acid, a rosin acid, a chemically modified rosin acid, or combinations thereof, and especially with a tall oil fatty acid-based emulsifier, the level of (i.e., extent of) neutralization of the acid value of the emulsifier impacts the tack of the dried emulsion. Insufficient neutralization of the acids yields an oily film which remains sticky, as can be measured for example after four hours at room temperature. An appropriate level of neutralization yields a dry film with little to no tack. The optimal level of neutralization or soaping is expected to be dependent on the nature of the emulsifier and the base or alkaline material used to partially neutralize the acid. For example, for distilled tall oil (DTO), an emulsion containing less than about 2% of caustic dries to form an oily film with some residual tackiness, while emulsions containing 2.5%-3.5% caustic dry to form a film with a desired level of little to no tack. The appropriate level of neutralization for any particular acid-based emulsifier can be determined using only routine testing.

Accordingly, the pH of the continuous phase (i.e., the aqueous phase) affects the properties of the pitch emulsion. In a further embodiment, the pH of the aqueous continuous phase is adjusted between 8.0 and 12, between 8.5 and 12, between 9.0 and 12, between 9.5 and 12, or between 10.0 and 12. The pH can be adjusted using a wide variety of alkaline materials, including alkali metal hydroxides and carbonates; but simply using caustic (NaOH) solution has proven suitable. The pH of the aqueous phase is adjusted in an appropriate fashion by adding the alkaline material (such as to the emulsifier, or to water used to form the emulsion) either before or after mixing the aqueous phase with the pitch and emulsifier to form the pitch emulsion. The pH of the aqueous phase can be adjusted by the addition of an appropriate base, such as sodium hydroxide, before the emulsion is prepared.

One of the advantages of the present invention is that a stable emulsion can be prepared at a solids concentration at which the emulsion can be easily pumped for storage and transportation, often to remote locations, at which time the emulsion then can be further diluted for application without experiencing problems caused by emulsion instability.

In an alternative embodiment, the pitch emulsion includes a finely divided filler, such as a finely divided calcium salt and particularly calcium carbonate. The presence of a filled also serves to reduce the tacky character of a film produced by drying a pitch emulsion. Other filler materials that could also be used include gypsum, lime, silica, magnesium oxide, magnesium carbonate, dolomite, vermiculite, talc, nut shell flours, nano-clays, bentonite clay, kaolin clay and other similar materials.

By finely divided is meant that the weight average particle size of the filler is less than 30 microns (μm) and that the filler has a distribution of particles such that at least 80% of the filler particles are less than 50 μm in size.

One suitable filler is finely divided calcium carbonate. Suitable finely divided calcium carbonates can be produced either by mechanical grinding, e.g., by grinding limestone, or by chemical precipitation. Smaller average particle sizes can generally be produced by precipitation techniques. Indeed, particle sizes below one micron are attainable. Commercial sources of both mechanically ground calcium carbonate and precipitated calcium carbonate include Huber Engineered Materials (the J.M Huber Corporation), Omya AG and Imerys.

One of the benefits of using an alkaline material, such as calcium carbonate, as the finely divided filler is that it reduces the corrosion one typically encounters, especially when using tall oil pitch, generally caused by the inherent acidity of the pitch.

The relative amount of filler and pitch in the emulsion can vary between wide limits. Generally, the filler is supplied to the emulsion in an amount, based on the amount of pitch in the emulsion, such that the filler constitutes between 30 and 100 percent by weight of the weight of pitch. Usually an amount of filler comprising about 40% to 80 by weight of the pitch should be sufficient.

The prior art has described various equipment designs that can be used for applying dust-reducing compositions, such as the pitch emulsions of the present invention, to open-top railcars (hopper cars). Notable in this regard, are the following U.S. Pat. Nos. 3,961,752; 5,350,596; 5,352,297 and 5,441,566. These and other devices for spraying or otherwise depositing a layer of the pitch emulsion onto the surface of material from which the development of fugitive dust is to be reduced can be used in connection with the present invention. By spraying an appropriate amount of the pitch emulsion on the dust-forming material, a crust layer forms that resists the effects of wind and other factors that contribute to the formation of fugitive coal dust. Usually an amount of 10 to 30 gallons (U.S.) per 1000 square feet of coal surface area of a pitch emulsion, adjusted by dilution to a solids concentration between 2 and 10 weight percent should be sufficient in most cases. Obviously, higher or lower application rates and different dilution levels may be appropriate in other circumstances.

In addition to being useful for treating open-top railcars transporting coal, the pitch emulsions of the present invention also are potentially useful in any application where fugitive dust may develop and thus there is a desire to reduce such dust formation. Other applications thus include the transportation of other bulk solids by rail cars, the transport of coal and other bulk solids by conveyor belts, such as in an industrial setting, coal storage areas and rural roads, including logging and mining roads. Examples of other bulk solids include fertilizers, minerals and grains.

It will be understood that while the invention has been described in conjunction with specific embodiments thereof, the foregoing description and examples are intended to illustrate, but not limit the scope of the invention.

Example 1

Preparation of a Tall Oil Pitch Emulsion

A pitch emulsion suitable for suppressing dust was made by blending four components, tall oil pitch, distilled tall oil (DTO), 50% caustic solution, and water by the following procedure. 69.9 g of room temperature water was added to a 250 ml glass jar. A 50% caustic solution was added (4.4 g). The water and caustic mixture was shaken. 50.0 grams of tall oil pitch (i.e. XTOL® Tall Oil Pitch) heated to 60° C. was added to the water and caustic solution. 16.0 g of DTO (distilled tall oil), also preheated to 60° C., was added to the mixture of water, caustic and tall oil pitch and the mixture was shaken manually until a homogeneous mixture was formed.

Example 2

Testing Tall Oil Pitch Emulsion of Example 1

A sample of the pitch emulsion for suppressing dust of Example 1 was applied to a Q panel (Q-Lab Corporation), and an 8 mil (essentially 0.2 mm) thick film was made using a wet film applicator. The film was allowed to dry at room temperature for 3 hours, and it was then tested for surface adhesion or tackiness by contacting the film with a gloved finger. The film had dried in a non-tacky manner, such that the gloved finger could be lifted from the film on the surface of the Q panel leaving only a slight imprint of the glove.

Example 3

Preparation of a Filled Tall Oil Pitch Emulsion

Water in an amount of about 8.8 parts by weight is added to a suitable vessel and heated to a temperature of 80 to 85° C. An alkali caseinate (ammonium caseinate) in an amount of about 1.25 parts by weight; a finely divided calcium carbonate (such as Hubercarb G260 available from Huber Engineered Materials (the J.M Huber Corporation)), in an amount of 12.5 parts by weight, and an aqueous solution of sodium hydroxide (50% NaOH by weight) in an amount of 1.9 parts by weight are added to the water and mixed thoroughly (mix for about 30 minutes). To the resulting paste, an additional 50.25 parts by weight water is added with mixing. After adjusting the temperature of the aqueous mixture, as needed, to a temperature of 80 to 85° C., a molten tall oil pitch, in an amount of about 25.2 parts by weight, is added to the aqueous phase with sufficient mixing to form the desired emulsion. A biocide can then be added.

Example 4

Preparation of a Filled Tall Oil Pitch Emulsion

Water in an amount of about 3.7 parts by weight is added to a suitable vessel and heated to a temperature of 80 to 85° C. An alkali caseinate (ammonium caseinate) in an amount of about 1.25 parts by weight; a precipitated calcium carbonate (such as Opti-cal 600 available from Imerys), in an amount of about 17.6 parts by weight, and an aqueous solution of sodium hydroxide (50% NaOH by weight), in an amount of 1.9 parts by weight are added to the water and mixed thoroughly (mix for about 30 minutes). To the resulting paste, an additional 50.25 parts by weight water is added with mixing. After adjusting the temperature of the aqueous mixture, as needed, to a temperature of 80 to 85° C., a molten tall oil pitch, in an amount of about 25.2 parts by weight, is added to the aqueous phase with sufficient mixing to form the desired emulsion. A biocide can then be added.

Assessing the tackiness of a particular material, including the pitch emulsions of the present invention, also can be determined using ASTM D 1640-03, Methods for Drying, Curing or Film Formation of Organic Coatings at Room Temperature. As noted, using this test, the tackiness of pitch emulsions can be compared and those of the present invention show a significant reduction in tack relative to unmodified emulsions. In particular, a wet film of the emulsion of the present invention should dry to a tack free film within 4 hours. The thickness of the test film should be essentially the thickness of the film of the emulsion as the pitch emulsion is to be applied in the particular application. In some applications, such as for allaying fugitive dust formation in open top rail-cars, the pitch emulsion should be tested at a film thickness of 8 mils. Other applications likely require drying of a wet film of a thickness of 7 mils, 6 mils, 5 mils, 4 mils, 3 mils 2 mils, or less to assess suitability.

In further embodiments, the present invention is:

1. A pitch emulsion comprising particles of a pitch dispersed in water in the presence of an emulsifying agent comprising a fatty acid, a chemically modified fatty acid, a rosin acid, a chemically modified rosin acid, or combinations thereof.
2. A method of making a pitch emulsion comprising blending with agitation sufficient to produce an emulsion (i) a molten pitch, (ii) an emulsifying agent comprising a fatty acid, a chemically modified fatty acid, a rosin acid, a chemically modified rosin acid, or combinations thereof and (iii) water.
3. The pitch emulsion of any of the preceding paragraphs where the pitch emulsion dries to a film of reduced tack.
4. The pitch emulsion of any of the preceding paragraphs where the pitch is a tall oil pitch.
5. The pitch emulsion of any of the preceding paragraphs where the emulsifying agent comprises a tall oil fatty acid, or a chemically modified tall oil fatty acid.
6. The pitch emulsion of any of the preceding paragraphs where the tall oil fatty acid or chemically modified tall oil fatty acid is selected from the group consisting of crude tall oil, distilled tall oil, TOFA, dimer acid, oxidized tall oil, maleated tall oil, oxidized and maleated tall oil and mixtures thereof.
7. The pitch emulsion of any of the preceding paragraphs wherein the emulsifying agent is partially neutralized.
8. The pitch emulsion of any of the preceding paragraphs wherein the water has a pH of at least 8.
9. The pitch emulsion of any of the preceding paragraphs wherein the water has a pH of between 8 and 12.
10. A pitch emulsion comprising particles of a pitch dispersed in water in the presence of an emulsifying agent and associated with a finely divided filler.
11. The pitch emulsion of the preceding paragraph where the pitch emulsion dries to a film of reduced tack.
12. A method for reducing the development of fugitive dust in a dust-forming material, comprising applying the pitch emulsion of any of the preceding paragraphs to the dust-forming material in an amount to reduce fugitive dust formation.
13. A method of reducing fugitive dust in a rail car filled with a dust-forming material comprising applying the pitch emulsion of any of the preceding paragraphs to the dust-forming material in an amount to reduce fugitive dust formation.
14. The method of paragraph 13 wherein the rail car is filled with coal.
15. A method of reducing fugitive dust in a dust-forming material during transport, storage or handling comprising applying the pitch emulsion of any of the preceding paragraphs to the dust-forming material in an amount to reduce fugitive dust formation.
16 The method of paragraph 15 wherein the dust-forming material is coal.

The present invention has been described with reference to specific embodiments. However, this application is intended to cover those changes and substitutions that may be made by those skilled in the art without departing from the spirit and the scope of the invention. Unless otherwise specifically indicated, all percentages are by weight. Throughout the specification and in the claims the term "about" is intended to encompass + or −5% and typically the variation is only about + or −2%.

We claim:

1. A pitch emulsion comprising particles of a pitch dispersed in water in the presence of an emulsifying agent comprising a fatty acid, a chemically modified fatty acid, a rosin acid, a chemically modified rosin acid, or combinations thereof, wherein the pitch contains from about 60 wt % to about 90 wt % unsaponifiables, based on the total weight of the pitch, and wherein the pitch emulsion forms a tack free film, as measured according to ASTM D 1640-03.

2. A method of making a pitch emulsion comprising blending a molten pitch containing from about 60 wt % to about 90 wt % unsaponifiables, based on the total weight of the pitch; an emulsifying agent comprising a fatty acid, a chemically modified fatty acid, a rosin acid, a chemically modified rosin acid, or combinations thereof; and water with sufficient agitation to produce an emulsion, wherein the pitch emulsion forms a tack free film, as measured according to ASTM D 1640-03.

3. A method for reducing the development of fugitive dust in a dust-forming material, comprising applying the pitch emulsion of claim 1 to the dust-forming material in an amount to reduce fugitive dust formation.

4. The pitch emulsion of claim 1 where the pitch emulsion dries to a film of reduced tack.

5. The pitch emulsion of claim 1 where the pitch is a tall oil pitch.

6. The pitch emulsion of claim 1 where the emulsifying agent comprises a tall oil fatty acid, or a chemically modified tall oil fatty acid.

7. The pitch emulsion of claim 1 where the emulsifying agent is partially neutralized.

8. The pitch emulsion of claim 7 wherein the water has a pH of at least 8.

9. The pitch emulsion of claim 8 wherein the water has a pH of between 8 and 12.

10. The pitch emulsion of claim 1 wherein the emulsifying agent is selected from the group consisting of crude tall oil, distilled tall oil, TOFA, dimer acid, oxidized tall oil, maleated tall oil, oxidized and maleated tall oil and mixtures thereof.

11. A method of reducing fugitive dust in a rail car filled with a dust-forming material comprising applying the pitch emulsion of claim 1 to the dust-forming material in an amount to reduce fugitive dust formation.

12. The method of claim 11 wherein the rail car is filled with coal.

13. A method of reducing fugitive dust in a dust-forming material during transport, storage or handling comprising applying the pitch emulsion of claim 1 to the dust-forming material in an amount to reduce fugitive dust formation.

14. The method of claim 13 wherein the dust-forming material is coal.

15. A pitch emulsion comprising particles of a pitch dispersed in water in the presence of an emulsifying agent and associated with a finely divided filler, wherein the pitch contains from about 60 wt % to about 90 wt % unsaponifiables, based on the total weight of the pitch, and wherein the pitch emulsion forms a tack free film, as measured according to ASTM D 1640-03.

16. The pitch emulsion of claim 15 where the pitch is a tall oil pitch.

17. The pitch emulsion of claim 15 where the filler is a calcium salt.

18. The emulsion of claim 17 where the filler is calcium carbonate.

19. The pitch emulsion of claim 15 where the emulsifier is casein.

20. The pitch emulsion of claim 15 wherein the water has a pH of between 8 and 12.

21. The pitch emulsion of claim 1 wherein the pitch has an acid value of about 25 to about 50.

22. The pitch emulsion of claim 1 wherein the pitch is a tall oil pitch comprising about 5 wt % to about 20 wt % fatty acids, about 5 wt % to about 20 wt % resin acids, and about 60 wt % to about 90 wt % unsaponifiables, based on the total weight of the tall oil pitch.

23. The pitch emulsion of claim 1 wherein the emulsifying agent is present in an amount of from about 1 wt % to about 100 wt %, based on the weight of the pitch.

24. The pitch emulsion of claim 1 wherein the pitch emulsion has a solids concentration between about 30 wt % and about 60 wt %.

25. The pitch emulsion of claim 1 wherein the emulsifying agent comprises a chemically modified tall oil fatty acid.

* * * * *